March 24, 1925.  1,530,961
H. TOUTÉE
RATCHET TRANSMISSION FOR MOTOR VEHICLES
Filed June 13, 1922
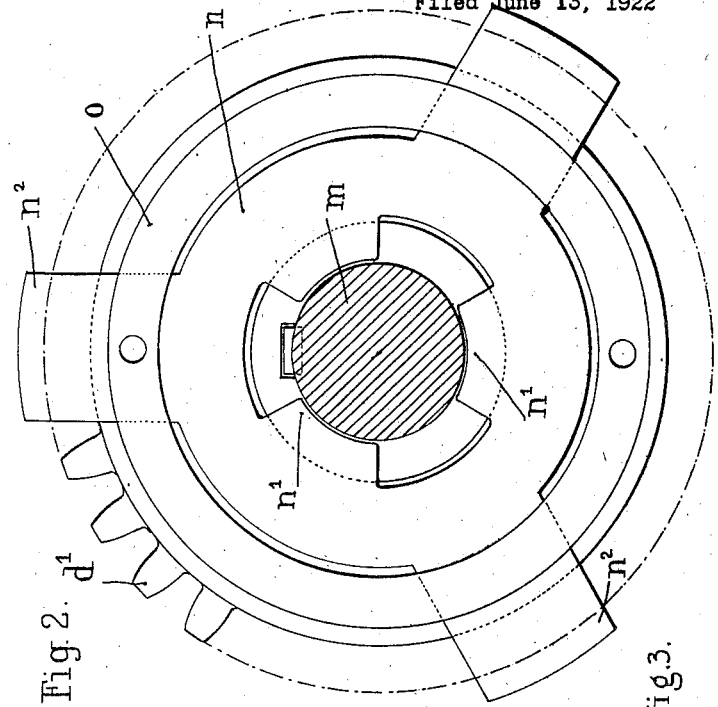
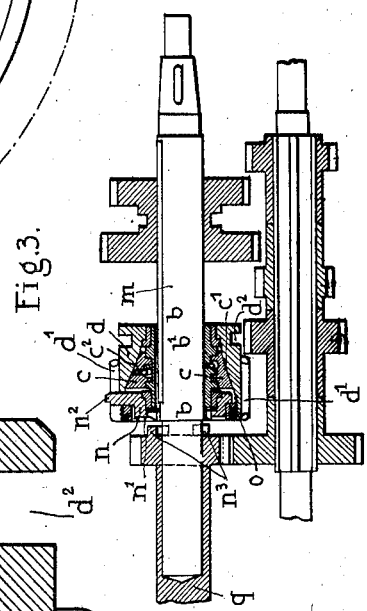
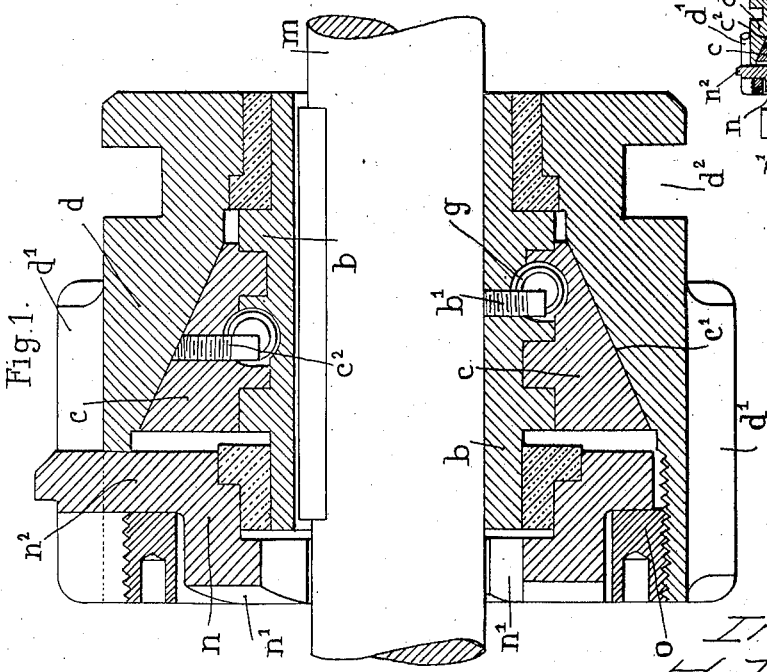
Inventor
H. Toutée
by
Langner Parry Card & Langner
Atty's.

Patented Mar. 24, 1925.

UNITED STATES PATENT OFFICE.

HENRI TOUTÉE, OF PARIS, FRANCE, ASSIGNOR TO LA SOCIÉTÉ ANONYME DE L'AUTO DÉBRAYAGE T. L., OF MONTROUGE, SEINE, FRANCE, A CORPORATION OF FRANCE.

RATCHET TRANSMISSION FOR MOTOR VEHICLES.

Application filed June 13, 1922. Serial No. 567,980.

*To all whom it may concern:*

Be it known that I, HENRI TOUTÉE, a citizen of the French Republic, and a resident of Paris, France, whose postal address is 3 Rue Felix Ziem, Paris, France, have invented new and useful Improvements in Ratchet Transmissions for Motor Vehicles, of which the following is a specification.

The present invention relates to transmission mechanism interposed between the motor and the change speed gear of an automobile vehicle, so as to facilitate the change of gear and to permit the vehicle automatically to coast or travel by impetus without turning the engine, and the engine to drive the vehicle as soon as the engine speed exceeds that of the transmission shaft connected to the wheels.

The present invention has for its object, the utilization of transmissions in which the connection of the two parts of the transmission is produced by a cone clutch, the control of which is effected by a screw and nut device.

The annexed drawing represents by way of example, the preferred form of construction of the invention.

Figure 1 is a longitudinal axial section, with parts in elevation.

Figure 2 is a transverse sectional view;

Figure 3 is a longitudinal section of a speed change device, showing the position occupied by the subject of invention.

It will be noted that in the form of construction shown the movable screw member or nut of the transmission mechanism is mounted upon the part fast to the driven shaft. This arrangement allows the said nut to be relieved of the forces of inertia generated by the variations in speed of the driven shaft when the gear-train in mesh is suddenly replaced by the next train of different velocity-ratio.

All the members of the cone-clutch are arranged inside the gear-box within a housing formed in the sliding gear which serves for the direct drive and the next lower gear.

Upon the shaft $m$ of the sliding gear, there is mounted upon a feather, the screw $b$ meshing with the nut $c$ of which the exterior forms the male cone $c^1$. Around these parts is revolubly mounted the female cone $d$ comprising external spur-gear teeth $d^1$ and a circular groove $d^2$ in which the striking fork of the sliding gear engages.

At its left-hand side the cavity within which the clutch members are fitted, is closed by a boss-plate $n$ carrying the dogs $n^1$ for the direct drive. The periphery of this plate is cut like a star, the rays or points of which engage in correspondingly shaped notches in the part $d$, so that any rotation of the parts $d$ and $n$ in relation to one another is impossible; an annular nut $o$ completes the connection of the boss-plate $n$ to the gear $d$.

A spring $g$ consisting of a coiled spring, bearing at one end against a stop $b^1$ solid with the screw and at the other end against a stop $c^2$ solid with the nut $c$, is located in a recess formed in the nut $c$ and the screw $b$, along a portion of the screw thread and on the inactive side of the latter. The spring $g$ tends constantly to revolve the nut $c$ in the direction bringing together the cones $c^1$ and $d$. The direction of the threads upon the screw $b$ is determined so that the cones $c^1$ and $d$ are pressed against one another when the driving shaft tends to rotate more quickly than the driven member and that in the contrary case the cones move apart, overcoming the action of the spring $g$.

The transmission only operates for either one of two speeds (direct drive and lower gear) to bring the cones in engagement as shown in Fig. 3, and this same arrangement presents the advantage that it can be fitted without any modification of the vehicle, by mere substitution of the specially formed sliding gear as described for the existing sliding gear of the change speed gear.

A shaft $q$ driven by a prime mover and referred to in this specification as the driving shaft, carries clutch fingers $n^3$ for cooperating with the dogs $n^1$, carried by cone member $d$.

In this form of construction the screw and nut are mounted upon the driven shaft so that the nut is relieved of the forces of inertia generated by the sudden engagement of one or other of the two gears provided by the direct-drive sliding gear.

It will be understood that the invention is not limited to the details of construction which have been described; thus for example the shape and the position of the spring may be modified, as well as the relative mounting of the different parts.

What I claim is:

1. A vehicle transmission of the type described, comprising a driving shaft, a driven shaft, a sliding gear element serving for the direct drive and the next lower gear, a first screw-threaded member slidably mounted on the driven shaft, a second screw-threaded member engaging with the first screw-threaded member, a first clutch member fast with said second screw-threaded member, a second clutch member cooperating with the first clutch member and fast with the sliding gear element and a drive connection between the second clutch member and the driving shaft.

2. A vehicle transmission of the type described, comprising a driving shaft, a driven shaft, a sliding gear element serving for the direct drive and the next lower gear, a screw-threaded member slidably mounted on the driven shaft, another corresponding screw-threaded member engaging the first screw-threaded member, a cone clutch surface upon said second screw-threaded member, a cone clutch surface upon the sliding gear element and cooperating with the first cone clutch surface, spring means normally biasing the two cone clutch surfaces together and a drive connection between the cone clutch surface upon the sliding gear element and the driving shaft.

In testimony whereof, I have signed my name to this specification in the presence of two subscribing witnesses.

HENRI TOUTÉE.

Witnesses:
J. ARMENGAUD, AÎNÉ,
P. ARMENGAUD.